United States Patent [19]

Holmes et al.

[11] 3,709,680

[45] Jan. 9, 1973

[54] PROCESS FOR REMOVAL OF ARSENIC FROM SULFO-ORE

[75] Inventors: W. Church Holmes, Lake San Marcos, Calif.; Enzo L. Coltrinari, Arvada, Colo.

[73] Assignee: Sunshine Mining Company, Kellog, Idaho

[22] Filed: July 9, 1971

[21] Appl. No.: 161,165

[52] U.S. Cl. .........................75/6, 75/101 R, 75/118, 75/121
[51] Int. Cl. .........................C21b 1/04, C22b 61/00
[58] Field of Search ................75/101 R, 118, 121, 6

[56] References Cited

UNITED STATES PATENTS

| 683,325 | 9/1901 | Phillips | 75/118 |
| 726,294 | 4/1903 | Hoyt | 75/118 |
| 2,835,569 | 5/1958 | Reynaud et al. | 75/118 |
| 3,218,161 | 11/1965 | Kunda et al. | 75/118 X |
| 3,476,553 | 11/1969 | Sebba et al. | 75/121 X |

FOREIGN PATENTS OR APPLICATIONS

| 22,619 | 1899 | Great Britain | 75/118 |

Primary Examiner—Allen B. Curtis
Attorney—March and Le Fever

[57] ABSTRACT

A process and apparatus for the removal of arsenic values from an ore concentrate includes the steps of leaching the concentrate with a solution which dissolves the arsenic, separating undissolved residue therefrom, acidifying the arsenic pregnant solution to precipitate arsenic and other mineral values as insoluble salts and treating the arsenic barren solution to regenerate sulfur and sodium values for recycle to the process.

10 Claims, 2 Drawing Figures

PROCESS FOR REMOVAL OF ARSENIC FROM SULFO-ORE

BRIEF STATEMENT OF THE INVENTION

This invention relates to a process for the removal of arsenic from materials in which it is contained. Particularly the invention relates to a novel process for the removal of arsenic from mixed ore mineral concentrates containing a minor proportion thereof.

More particularly, the invention relates to an improved process for the removal and/or recovery of arsenic from ore concentrates which may contain mixed values of copper-gold-sulfur-arsenic-antimony and which involves the steps of leaching the arsenic values from the ore concentrate, causing arsenic compounds to precipitate from the solution and recovering values such as gold, antimony, etc., from the leach solution.

BRIEF DESCRIPTION OF THE INVENTION

The novel process of this invention may be logically divided into a number of sequential steps as follows:

1. Leaching of the concentrate with a caustic solution;
2. Treatment of the arsenic pregnant solution; and
3. Treatment of the arsenic barren solution.

There are a number of processing steps involved in each of the above-mentioned general classifications in which conditions of the reaction are critical and must be carefully controlled to obtain the optimum results. These critical conditions will be particularly noted as this description proceeds.

PREPARATION OF CONCENTRATE

Arsenic represents an undesirable contaminant in smelting operations particularly in a number of copper-containing minerals. Exemplary of such minerals are the sulfo-arsenic salts of copper, sulfo-antimony salts of copper and mixtures such as tennantite, luzonite, enargite, tetrahedrite, famantinite and the like. One particularly valuable ore mineral containing components in which the arsenic content of approximately 19 percent is especially undesirable is enargite having approximately the following composition:

|  |  | (approximate) |
|---|---|---|
| Copper | = | 48.0% |
| Arsenic | = | 19.0% |
| Sulfur | = | 33.0% |

This particular mineral is often found to include minor amounts of gold, silver, antimony, mercury, bismuth, tin, zinc, lead and other metals.

Generally speaking, the concentrate is prepared by a selective flotation operation, as is well known in the art.

1. Leaching of the Concentrate with a Caustic Solution

In accordance with the inventive process the concentrate is leached with a hot concentrated caustic solution, preferably of sodium sulfide, although it is possible to use sodium hydroxide or mixtures of sodium sulfide and sodium hydroxide, or sodium hydroxide and sulfur. Since the undissolved residue from the leaching step contains valuable mineral valves, the undissolved solids from the leaching step are settled, filtered, washed and dried. They are then removed from the process for metal recovery by conventional techniques.

The temperature of the concentrated sodium sulfide solution used to dissolve the arsenic from the flotation concentrate must be carefully controlled in order to obtain the optimum results. The sodium sulfide solution normally contains from about 100 to about 600 grams per liter of sodium sulfide, sodium sulfide-sodium hydroxide or the equivalent of the other mixtures.

The temperature of the leaching solution in order to obtain the maximum results in an efficacious and rapid manner should be within the range at sea level of from about 75°C to the temperature just below boiling, preferably from about 100° to about 205°C. It has been found that optimum extraction of arsenic from the flotation concentrate occurs if the leaching time is maintained at one within a range of from about 1 to 20 hours, preferably from about 4 to 12 hours. Agitation is preferably maintained to aid in insuring an adequate contact between the leaching solution and the flotation concentrate.

The major content of the concentrate remains in the residue as the corresponding sulfides, and is separated in that form for value recovery.

The hot leach mixture from the leaching operation is diluted with preferably hot water prior to separation of residues. The dilution prevents undesirable crystallization of the salts with temperature drop and results in more efficient and effective further processing.

The diluted mixture is preferably dewatered by a plurality of thickeners, arranged for counter-current decantation, the thickened slurry filtered and the filtrant contains desirable mineral values. The filtrate is combined with no decant from the thickening step and passed to the next stage of the process.

As an example of the leaching step the following is given.

A sample of a flotation concentrate containing 12.2 percent arsenic and weighing 100 grams was contacted with a solution containing 390 grams of sodium sulfide per liter of water. The solution was agitated for 8 hours at a temperature of 100°C. After filtering and washing with hot water, the residue assayed 0.5 percent arsenic.

2. Treatment of the Arsenic Pregnant Solution

The solution from the leaching step may contain, in addition to the arsenic values, gold, antimony, mercury, sodium and sulfur values which are recoverable and which the process of this invention is designed to recover. The arsenic removal and gold recovery is accomplished in a series of steps which will now be described.

A. Recovery of Gold Values

The ore concentrate described above contains approximately 1.55 ounces of gold concentrate. Although leaching conditions may be controlled to regulate the amount of gold that is dissolved, any gold present in the arsenic pregnant solution may be removed by reducing the pH of the solution to one within the range of from about 9–11. This acidification step is preferably carried out by contacting the solution with certain types of acidifying agents as, for example, $SO_2$ gas. The contact is carried out until the pH of the solution is at the desired level, usually pH 10. At this point, any gold present is precipitated, filtered, washed, dried for recovery of the mineral values.

During the acidification step hydrogen sulfide is evolved which is normally purified and recycled to the process.

B. Removal of Arsenic

The arsenic pregnant solution which has been treated to recover dissolved gold is now subjected to a second acidification step. Certain types of acidifying agents are again used, such as $SO_2$ gas, and the solution is contacted until the pH is reduced to one within a range of about 2 to 6, preferably about 3 to 4. The $H_2S$ generated by this acidification step is cycled for use at a subsequent step in the process.

At a pH of 3 and at a temperature of 25° to 50°C, preferably below about 50°C, the arsenic values in the arsenic pregnant solution precipitate in the form of sulfides, and the solid pulp is filtered and washed. The solids from the filtration step comprise essentially the arsenic sulfides and are normally discarded. These are normally the tri- or pentasulfides.

3. Treatment of the Arsenic Barren Solution

The arsenic barren solution contains sodium and sulfur values which are recovered and recycled for use.

In summary, this recovery involves evaporation of the solution to crystallize these values in the form of salts, roasting the salts to recover sulfur in the form of $SO_2$ gas and thereby oxidizing the sodium salts to sulfates and thereafter reducing the calcine with a source of carbon to convert the sodium values to sodium sulfide which is dissolved and recycled to the leaching step.

A. Evaporation Step

Evaporation of the arsenic barren solution is carried out in evaporation equipment known to the art and yields a variety of sodium-sulfur compounds.

If desired a portion of the sulfur obtained during the evaporation step may be removed prior to passing the material to the oxidation roast.

B. The Oxidation Roast

The solids from the evaporation step containing the sulfur and sodium values are conveyed to a roasting zone where they are subjected to temperatures in the order of 150° to 600°C, preferably 400° to 500°C. The roasting is conducted in an oxidizing atmosphere normally in the form of air. $H_2S$ obtained from the previous step may also be introduced. The effluent gases from the roasting step contain approximately 13% $SO_2$ by volume, which are recycled to the acidification step.

The calcine obtained from this roast is passed to the next step in the process.

C. The Reducing Roast

The calcine from the first roasting step is preferably admixed with a source of carbon, normally in the form of a pulverized coal. After subjecting the calcine to an adequate temperature for the desired reaction time, the sodium sulfate contained in the calcine is reduced to sodium sulfide.

Product from this second roasting or furnacing step contains about 75% $Na_2S$, the remainder being ash, unburned coal, and impurities. The product is then mixed with water and the dissolved sodium sulfide is recycled to the process.

DETAILED DESCRIPTION OF THE APPARATUS OF THE INVENTION

Figure 1:
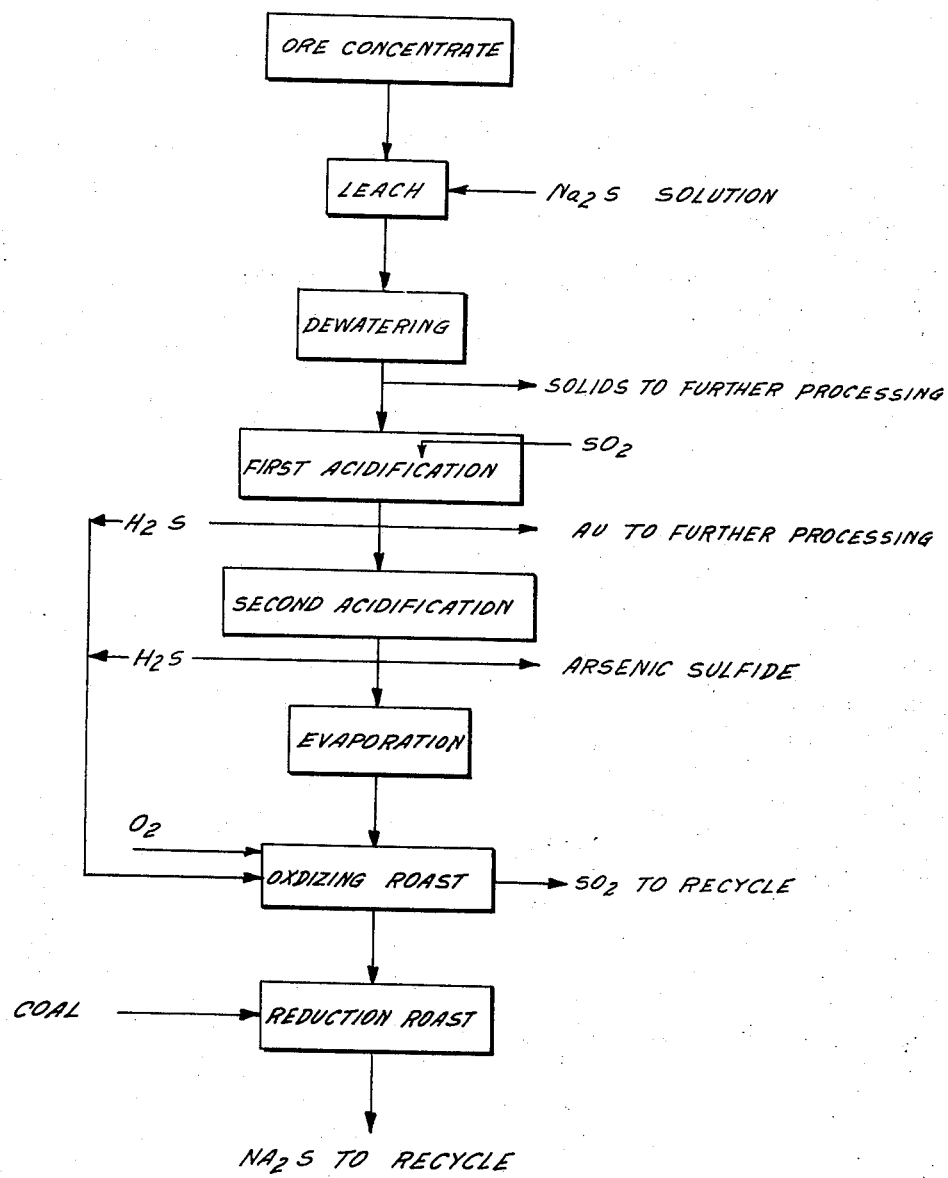
Figure 2:
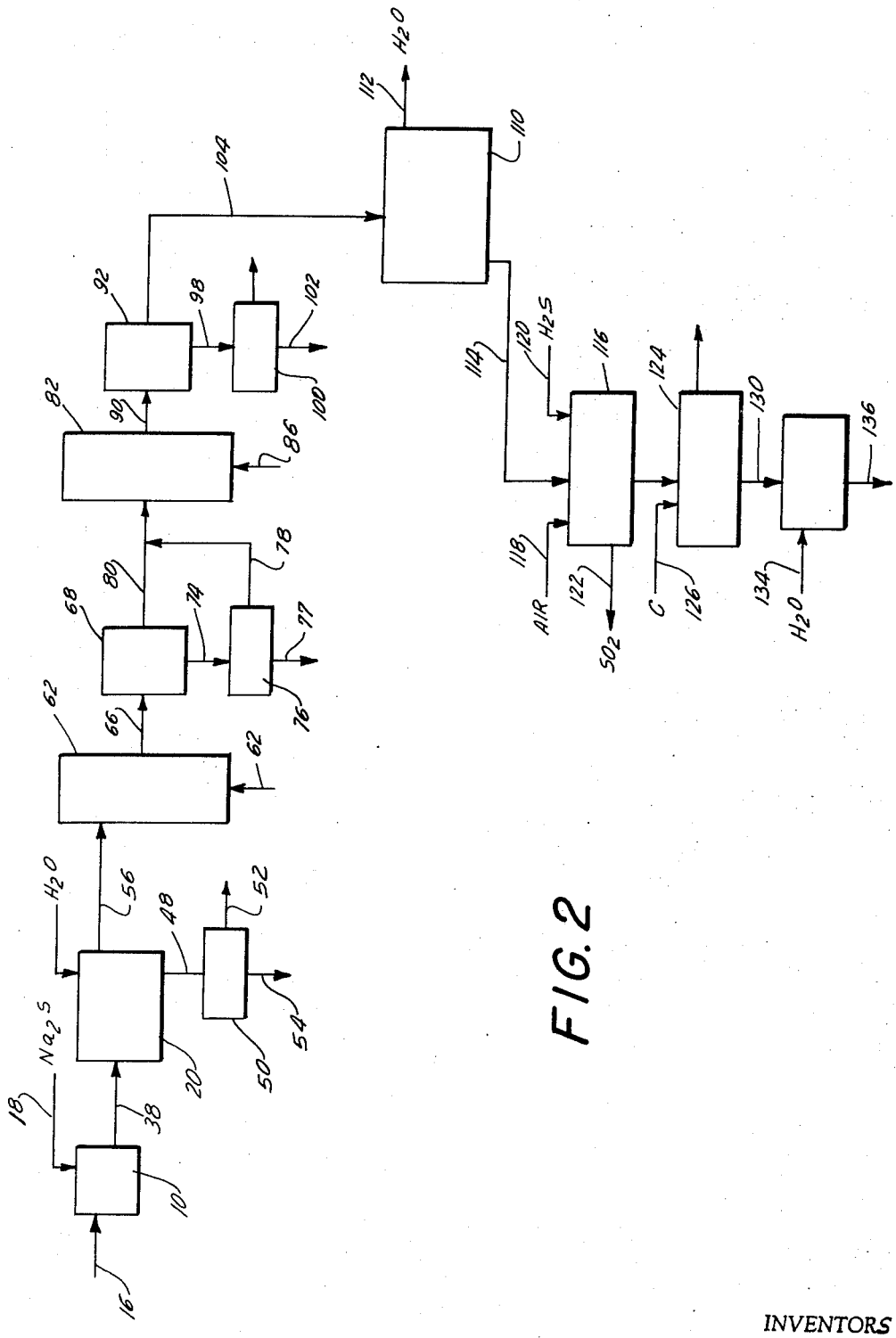

The invention is more clearly explained by reference to the following drawings in which:

FIG. 1 represents a block diagram of the flow sheet of one embodiment of the invention; and FIG. 2 is a process block diagram of one form of apparatus useful for carrying out the process.

It is to be understood that the apparatus which is hereinafter described is only illustrative of one type of apparatus which may be used to obtain the desired results and the specification thereof is simply to facilitate an understanding of the various steps involved. This exemplary illustration is not to be considered as a limitation of any kind on the apparatus as defined in the appended claims.

Turning now to the drawings, and with particular reference to FIG. 2, there is shown in the block diagram form an arrangement of apparatus wherein the feed to the process, an ore concentrate, is fed to leaching vessel 10, which may be equipped with an agitator driven by a motor through line 16. It will be appreciated, of course, that for handling solid materials, line 16 may be a screw or other type of conveyor means and the latching vessel will be equipped with a hopper as a feed inlet. If desired the leaching zone may be a plurality of leaching vessels and may be provided with means for temperature control as known to the art.

Hot sodium sulfide solution is added to leaching vessel 10 through line 18. After the desired leaching time the slurry is passed to a series of thickening vessels arranged for countercurrent washing, designated here by numeral 20. Each thickener may be provided with a scraper or rake to move the thickened slutty or residue toward the center of the vessel bottom.

The leach solution is introduced to the thickening zone by means of line 38. Water at the desired temperature is introduced to the thickener 20, such that the slurry of leaching solution and solids passes counter-currently thereto.

Thickened solids are withdrawn from settler 20 through line 48 and passed to filter 50. The filtrate is recycled to the process through line 52. Separated solids, which represent the mineral values in the feed concentrate, are removed from the filter through line 54 and set for further processing.

The counter-current wash or decant from the settlers or thickening zone is withdrawn through line 56 and introduced into first acidification vessel 62. This vessel, which may be any of the known liquid-gas contacting vessels known to the art, is equipped with inlet line 62 and a gas distribution means for bubbling an acidifying gas, such as $SO_2$, through a column of the arsenic pregnant solution in the vessel.

Acidification is continued in this vessel until a pH of within a range of from about 9–11, preferably 10, is reached. The solution with precipitated gold values, normally in the form of its sulfide, is then withdrawn through line 66, for example, and introduced to thickener 68 which may be equipped with a rake driven by a motor.

In this thickener the solids are allowed to settle, gathered by the rake and withdrawn through line 74 to filter 76. Separated solids which contain the precipitated gold sulfides, are removed from the filter through line 77 for processing to recover the gold content thereof.

The arsenic pregnant solution from thickener 68, with gold content removed, and the filtrate from filter 76, through lines 78 and 80, is passed into a second acidification vessel 82. In this liquid-gas contacting vessel, as in vessel 62, an acidifying gas, such as $SO_2$ is introduced at the bottom, through line 86 and a sparger, so that intimate liquid gas contact is obtained and maintained until the liquid pH is reduced to from 2 to 4, preferably about pH 3. At this level arsenic present in the solution precipitates as its sulfide.

The mixture of precipitated solids and solution is withdrawn from acidification vessel 82 through line 90 and passed to thickener 92. In this vessel, the arsenic sulfide solids settle to the bottom, are gathered by a rake powered by a motor and discharged through line 98 to filter 100, where they are separated from their accompanying solution and discarded through line 102.

The decant from thickener 92, now an arsenic barren solution, is introduced by means of line 104 into an evaporation zone, represented in FIG. 2 by vessel 110.

In the evaporation zone, the arsenic barren solution is reduced to dryness, the water driven off as steam through line 112, condensed and recycled to the process. The salts, or crystallized solid residue remaining in the evaporation zone, are collected by known methods removed by means indicated as line 114 and passed to roaster 116.

This first roasting zone is an oxidizing zone and is maintained at a temperature of about 400° to 500°C. In an atmosphere of an oxidizing gas, such as air, introduced through line 118, and $H_2S$ through line 120, the sodium values present in the salts from the evaporator are converted to sodium sulfate. Some of the sulfur present is converted to $SO_2$ and is withdrawn through line 122 for further processing and is recycled to the acidification step.

The solid material, or calcine from roaster 116 is introduced into a second furnace or roaster 124. In this vessel a reducing environment is present with temperatures of from about 850° to about 1,000°C. A reducing agent, such as carbon, is introduced through line 126.

The calcine from roasting vessel 124 is withdrawn through line 130 and passed to dissolution vessel 132. Water is added through line 134 and the resulting sodium sulfide solution recycled through line 136 to the process.

Thus it is seen that a process for the removal of undesirable arsenic values from an ore concentrate is provided wherein the ore concentrate is leached with a solution in which the arsenic values are soluble to form an arsenic pregnant solution. The arsenic pregnant solution is then treated with an acidifying agent to precipitate arsenic compounds and to form an arsenic barren solution which may then be treated to recover valuable sodium and sulfur values therefrom. The leaching solution is preferably a hot caustic solution such as a sodium sulfide solution, and the sodium values are recovered and recycled to the process in the same form. pH control of the various solutions is a factor and is preferably controlled by the use of an acidifying gas such as sulfur dioxide.

What is claimed is:

1. A process for the removal of arsenic from sulfoore concentrates containing the same which comprises the steps of leaching said ore concentrate with a alkali-metal sulfide solution in which arsenic compounds are soluble to form an arsenic pregnant solution and an insoluble residue;

separating said arsenic pregnant solution from said residue;

treating said arsenic pregnant solution with an acidifying gas to reduce the pH to precipitate arsenic compounds and to form an arsenic barren solution;

separating and discarding said arsenic compounds;

evaporating said arsenic barren solution to crystallize salts therefrom;

roasting said crystallized salts in the presence of oxygen to form said acidifying gas and a solid residue;

recycling said acidifying gas to the process;

roasting said solid residue in the presence of a reducing agent to form alkali-metal sulfide therefrom; and recycling said alkali-metal sulfide to the process.

2. A process according to claim 1 wherein said leaching solution is a hot caustic solution.

3. A process according to claim 1 wherein said leaching solution is a hot solution of sodium sulfide containing from about 100 to about 600 grams per liter of sodium sulfide.

4. A process according to claim 3 wherein said leaching solution is at a temperature of from about 75° to about 105°C and said leaching is carried out for from about 4 to about 12 hours.

5. A process according to claim 1 wherein said acidifying gas is sulfur dioxide.

6. A process according to claim 5 wherein said pH is reduced to about 9 to about 11, any precipitated residue filtered off and recovered and thereafter the pH further reduced to about 2 to about 6.

7. A process according to claim 1 wherein said precipitated salts are roasted to a temperature of from about 150° to about 600°C.

8. A process according to claim 1 wherein said solid residue is roasted to a temperature of from about 850° to about 1,200°C for from about 3 to about 6 hours in the presence of a reducing agent.

9. A process according to claim 8 wherein said reducing agent is pulverized coal.

10. A process for the removal of arsenic from ore concentrates containing the same which comprises the steps of leaching said ore concentrate with a solution containing from about 100 to about 600 grams per liter of sodium sulfide at a temperature of from about 100° to about 105°C to form an arsenic pregnant solution and an insoluble residue;

separating said arsenic pregnant solution from said residue;

treating said arsenic pregnant solution with sulfur dioxide gas to reduce the pH to about 9 to about 11 to precipitate gold compounds therefrom;

separating the precipitated gold compounds; further reducing the pH of the solution with sulfur dioxide gas to about 3-4 to precipitate arsenic compounds and to form an arsenic barren solution; separating and discarding said arsenic compounds;

evaporating said arsenic barren solution to crystallize salts therefrom;

roasting said crystallized salts in the presence of oxygen at a temperature of from about 400° to about 500°C to form a recycle dioxide and a solid residue;

recycling said sulfur dioxide to the process;

furnacing said solid residue at a temperature of from about 850° to 1,200°C in the presence of carbon to recover solid sodium sulfide therefrom;

dissolving solid sodium sulfide in water to form a solution thereof; and recycling sodium sulfide solution to the process.

* * * * *